Figure 1:
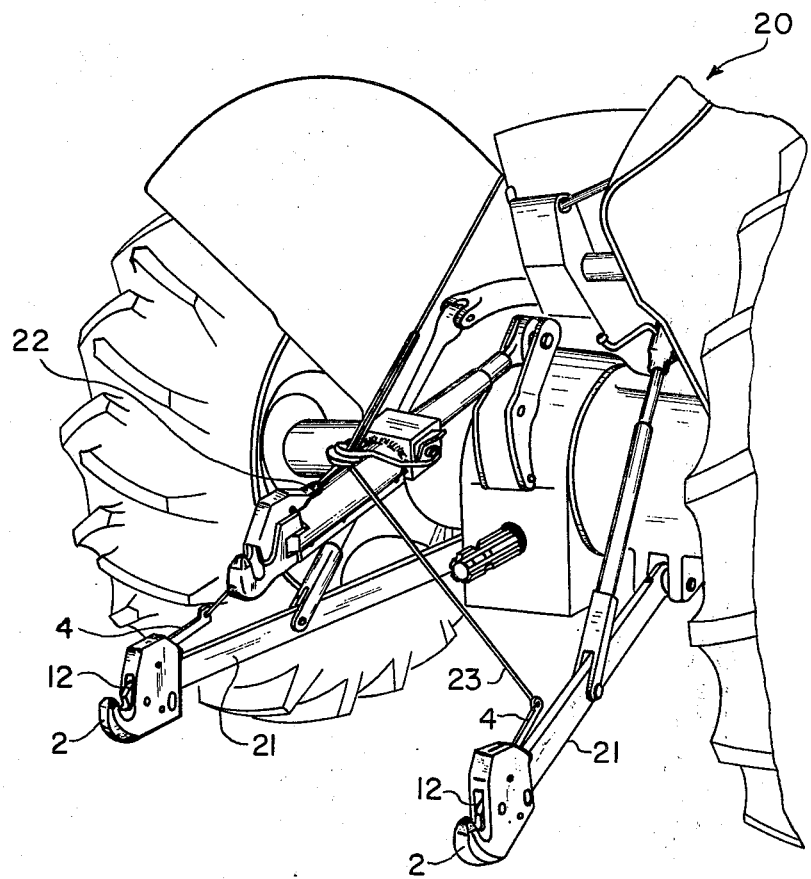

United States Patent
von Allworden

[11] 3,977,698
[45] Aug. 31, 1976

[54] COUPLING HOOK FOR A TRACTOR THREE-POINT HITCH

[75] Inventor: Wilhelm von Allworden, Lohmar, Germany

[73] Assignee: Jean Walterscheid GmbH, Lohmar, Rhineland, Germany

[22] Filed: Mar. 20, 1975

[21] Appl. No.: 560,134

[30] Foreign Application Priority Data
Mar. 26, 1974 Germany............................ 2414441

[52] U.S. Cl............................................ 280/461 A
[51] Int. Cl.² ........................................ B60D 1/04
[58] Field of Search............ 280/461 R, 461 A, 479, 280/508, 509, 510; 172/272

[56] References Cited
UNITED STATES PATENTS

| | | | |
|---|---|---|---|
| 2,979,137 | 4/1961 | Hess................................... | 172/272 |
| 3,172,686 | 3/1965 | Beard................................. | 280/461 A |
| 3,220,751 | 11/1965 | Tweedale........................... | 280/461 |
| 3,356,388 | 12/1967 | Prillinger.......................... | 280/479 |

FOREIGN PATENTS OR APPLICATIONS

| | | | |
|---|---|---|---|
| 1,208,878 | 2/1960 | France............................... | 280/508 |

Primary Examiner—M. H. Wood, Jr.
Assistant Examiner—R. Schrecengost
Attorney, Agent, or Firm—Edmund M. Jaskiewicz

[57] ABSTRACT

A three-point connection on a tractor is provided with a coupling hook for receiving a coupling bolt. The hook has a pivotally mounted locking element therein one arm of which lockingly receives the coupling bolt and the other end being pivotally connected to an actuating lever. When the actuating lever is moved to the unlocking position a portion of the lever pivots around a fulcrum within the pocket of the hook and the lever further pivots the locking element to unlock and eject the coupling bolt.

6 Claims, 2 Drawing Figures

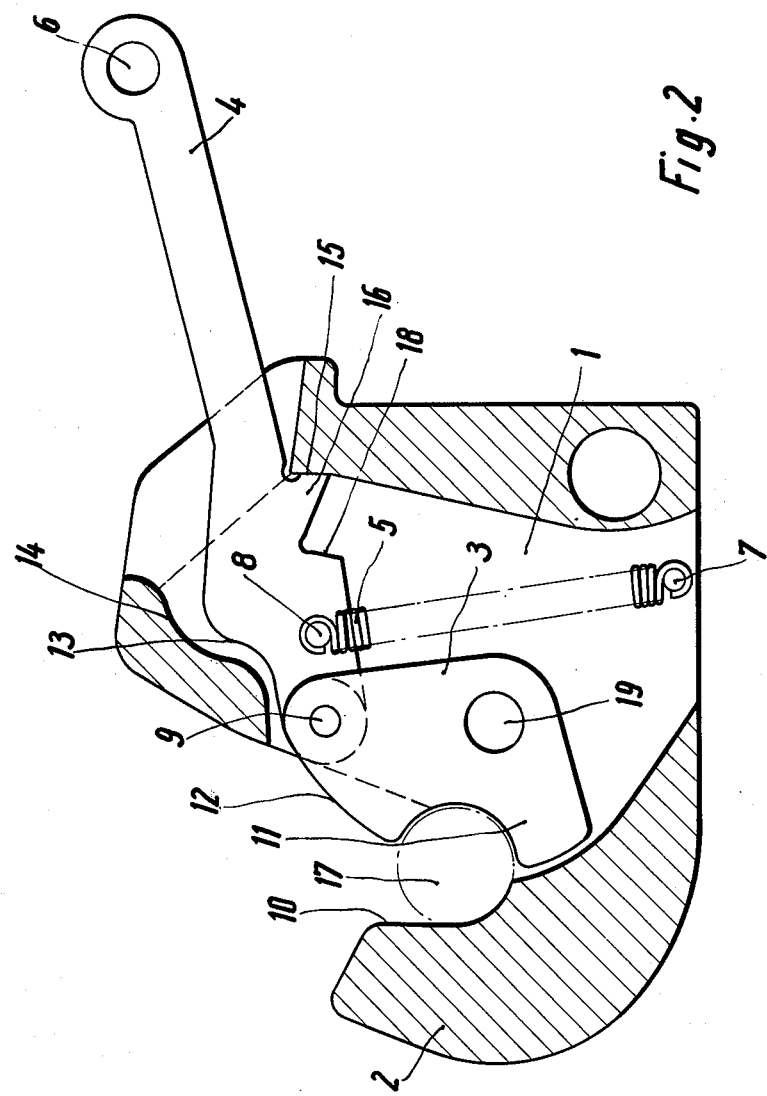

COUPLING HOOK FOR A TRACTOR THREE-POINT HITCH

The present invention relates to a coupling hook such as employed on a three-point connection on a tractor, more particularly, to a lockig device in a coupling hook for securing a coupling bolt received within the hook.

The coupling hooks on a three-point connection such as employed on agricultural tractors have been provided with various forms on locking devices for securing coupling bolts therein. The coupling bolt is a part of the working machine or implement which is to be connected to the tractor. SUch a locking device generally comprises a catch or locking element pivotally mounted within the pocket of the couplig hook and maintained in its locking position by coacting with a spring-loaded actuating lever. The lever is moved into a release position in order to unlock the catch element.

A particular form of such a catch element was secured in its operative or locking position by a separate and independent safety lever. The locking element could be moved into its release position after the release of the safety lever. The safety lever was displaced from its locking position into its release position during the coupling operation by the action of the coupling bolt of the implement or apparatus being connection to the tractor. The catch element moves out of the way of the bolt as it is received into the interior of the hook pocket so that the coupling bolt eventually is positioned on the bottom of the hook pocket. A spring is between the catch element and the safety lever then acts on the lower end of the catch element to push the lower catch element end tangentially over the coupling bolt to effectively block the opening leading into the hook pocket The upper end of the catch element then engages with an abutment provided in the hook pocket.

The safety lever which is in the form of a crank lever is pivoted about its fulcrum and has a projection thereon which engages a corresponding stop position provided on the upper end of the catch element. At this stage the coupling bolt is completely secured against unintentional opening of the hook closure device.

This known hook locking device is not satisfactory during an uncoupling operation when the tractor and the connected implement are standing upon uneven surfaces or the coupling bolts are disposed on one side of the bottom of the hook pocket because of the symmetrical position of the coupling bolts on the implement. The end of the coupling bolt which bears on one side of the bottom of the hook pocket can be more easily released from locking engagement while the other side of the coupling bolt is pressed tightly against the lokcing face of the catch element. Under such circumstances all of the locking devices cannot be simultaneously released. The uneven forces exerted by the coupling bolts against portions of the hook pockets oppose the release of the second locking device to a considerable extent because the catch element must be pushed tangentially over the coupling bolt and downwardly into a release position against strong opposition by the coupling bolt. As a result, the forces applied by the cable, usually by the tractor operator, are no longer sufficient to open the locking device. In addition, the catch element cannot be released when it is wedged firmly against the coupling bolt under such forces applied by the coating surfaces because the structure cannot amplify the leverage force required for this purpose. The safety lever is provided with two arms of equal length. This means that the tractor operator must try by repeated lifting and lowering of the guides and at the same time by continued pulling of the cable to find a point at which the jamming or wedging effect becomes zero and the closing deice opens. At this point the lower guide will be dropped and will release the coupling bolt.

Actually, the unlocking operation is somewhat unreliable even if only the actual weight of the lower guide with its hook pocket bears against the catch element and coupling bolt when the connected implement is positioned on level ground and without any wedging or compression force effects as described above.

A further disadvantages of this known catch or locking element for a coupling hook is that the reliability of operation decreases should any dirt enter into the hook pocket and become lodged between the safety lever and the catch element.

It is therefore the principal object of the present invention to provide a novel and improved locking element device for the coupling hook employed on a three-point linkage of a tractor.

It is another object of the present invention to provide such a locking device which enables the locking and release operations of the coupling hooks to be easily carried out by the tractor operator without any necessity for leaving his seat.

It is a further object of the present invention to provide such a locking device wherein any wedging effects between the coupling bolts and locking elements which might be caused by changes in position of the locking bolts are overcome or compensated for during the release or unlocking operation.

It is an additional object of the present invention wherein the coupling and uncoupling operations can be safely performed by the tractor operator using a minimum of force or power.

According to one aspect of the present invention a coupling hook for a three-point hitch on a tractor may comprise a two-armed locking element pivotally mounted within the pocket of the hook and having a locking and ejecting portion on one arm thereof. A lever is pivotally connected to the other end of the locking element and has a locking face engaging a fixed portion of the hook when the lever and locking element are in the locked position. Means are provided within the pocket of the hook for defining a fulcrum about which the lever pivots when actuated to release the locking element from its locked position.

After unlocking, the locking element is retained in its released position until the next coupling operation. The actuating lever and locking element are moved into the locking position when the locking element is engaged by the coupling bolt during a succeeding coupling operation. The opening or release movement of the locking element is limited by the actuating lever having a face thereon engaging with a fixed surface in the pocket of the hook. The lever will be maintained in this release position with its locking face against a fixed surface of the hook under the influence of a spring so that the locking device is opened for the next coupling operation.

Other objects and advantages of the present invention will be apparent upon reference to the accompanying description when taken in conjunction with the following drawings, which are exemplary, wherein;

FIG. 1 is a perspective view of the rear portion of a tractor equipped with a three-point hitch and having the locking device of the present invention on the lower guides; and FIG. 2 is a longitudinal sectional view of a coupling hook on the lower guide showing the locking device according to the present invention.

Proceeding next to the drawings wherein like reference symbols indicate the same parts throughout the various views a specific embodiment of the present invention will be described in detail.

In FIG. 1 there is indicated generally at 20 a tractor such as generally used for agricultural purposes equipped at the rear thereof with a three-point hitch comprising lower guides 21 and upper guide 22. A coupling hook 2 according to the present invention is mounted on each of the lower guides 21 and this hook is illustrated in greater detail in FIG. 2. The hook 2 is provided with a pocket 1 in which a two-armed locking element 3 is pivotally mounted on a pin 19. The locking element 3 is in the form of an anagle or crank lever and has its upper arm pivotally connected by a pin 9 to an actuating lever 4 upon the outer end of which is formed an eye 6 to which is connected an operating cable 23 as seen in FIG. 1.

A tension spring 5 has one end connected to the lever 4 by means of a pin 8 and its lower end is connected within the pocket upon a pin 7. The spring 5 functions to maintain the actuating lever 4 in its operative or locking position as shown in FIG. 2.

Upon the upper surface of the actuating lever 4 there is formed a release surfce 13 which is adapted to engage with a curved surface 14 within the pocket 1 such that the curved surface 14 functions as a fulcrum about which the actuating lever 4 can be pivoted during the release operation. The lower surface of the lever 4 is formed with a shoulder or locking face 16 which engages with a fixed portion 15 on the hook pocket when the lever 4 and locking element 3 are in their locked positions. Also on the lower surface of the lever 4 there is provided a second shoulder 18 which functions as a limit stop when it engages with the fixed position 15 during the release movement of the lever 4.

The upper surface of the locking element 3 which is directed toward the mouth or opening 10 of the hook is provided with a sliding curved surface 12. Adjacent and below the curved surface 12 there is a locking and ejector opening or notch 11 in which is received the coupling bolt of a machine or implement which is to be attached to the coupling hook. Thus, the second or lower arm of the locking element 3 is provided with a locking and ejecting portion in which a coupling bolt 17 is received.

In order to couple or operatively attach an implement or machine having a corresponding three-pont linkage, the tractor is driven in reverse so that the guides are pushed below the corresponding coupling points of the machine. The locking devices on the coupling hooks are open. As the guides are raised, the coupling bolt 17 which is on the linkage of the machine slides over the face 12 on locking element 3 into the locking and ejector opening 11. As the couplilng bolt 17 slides over the curved face 12, the locking element is pivoted downwardly until the coupling bolt 17 is engaged in the bottom of the opening 10 and within the ejector opening 11. The actual locking portion of the locking element 3 then becomes positioned across and over the coupling bolt 17 as shown in FIG. 2. The actual locking of the coupling bolt 17 is achieved when the locking element 3 draws the actuating lever 4 by means of the pivot connection 9 into the hook pocket in the direction of the hook mouth 10. This displaacement of the lever 4 will cause the limit stop 18 to become detached from the fixed position 15 of the hook pocket and the operative or locking face 16 of the lever 4 is pulled downwrdly into its operative locking position under the action of the tension spring 5. The locking face 16 thus makes a positive contact engagement with the fixed position 15 to secure the locking device against unintentional opening.

In order to open or release the locking device, the tractor operator pulls the cable 23 which thus pivots the actuating lever 4 upwardly as viewed in FIG. 2. This upward movement of the lever 4 first releases the safety device since it disengages the locking face 16 from the fixed position 15. Subsequent upward movement of the lever 4 will cause its curved face 13 to engage the fulcrum surface 14 at which point the lever 4 now functions as a two-arm lever and pivots about the fulcrum 14.

The force of the lever is then transmitted by the pin 9 to locking element 3 and futher amplified. The locking element 3 is pivoted about its pivot connection 19 so that its upper lever arm pivots into the hook pocket 1 while at the same time the locking portion of the locking and ejector opening 11 releases the coupling bolt 17 in the upward direction. Simultaneously the lower lever arm of the locking element 3 ejects the coupling bolts 17 upwardly within the hook mouth 10. At this point, the coupling bolt 17 is completely released and the lower guide 21 of the tractor is now free to be lowered.

When the operator releases the cable 23, the limit stop 18 on the actuating lever 4 will again become engaged with the fixed position 15 under the action of the spring 5. The locking device is now open and may be now used for another coupling operation.

It will be readily apparent that a major advantage of the locking device according to the present invention is that the coupling and uncoupling operations may be easily and safely performed by the tractor operator without leaving his seat on the tractor and that any coupling bolts which may have been wedged between the locking element and hook mouth during operation of the tractor can still be easily released. This easy release is possible because of the relatively short load arm of the actuating lever applied by means of the pivot connection and the upper lever arm of the locking element a force or leverage to the lower arm of the locking lever which is approximately 15 times the value of the force applied to the eye 16 of the eye 16 of the actuating lever through the cable 23.

A further advantage is that during the release operation the locking lever moves into the interior of the hook pocket under the action of the actuating lever 4 to thereby open the locking action of the locking lever against bolt 17 and thus releasing the coupling bolt 17 which may be pressing against the locking portion of the locking element. At the same time, the lower end 11 of the locking element moves upwardly so as to eject the coupling bolt 17 since the lower portion of the coupling bolt 17 is resting on the ejector portion of the locking element. These funtions will also release any wedged or bent coupling bolts which may have become jammed in a direction transversely of the longitudinal axis of the coupling hook. During further pivotal movement of the locking element, the coupling bolt will be raised until the coupling hook and lower guide are completely freed of any impeding connection with the coupling bolt and the guide and coupling hook may now freely descend.

It is to be borne in mind that the actuating lever and locking element will be retained in their release positions until a succeeding coupling operation. During such a coupling operation the coupling bolt 17 as it drops into position will become closely received within the ejector portion of the locking element and will thus pivot the locking element into its operative locking position under the weight of the machine being attached to the coupling hook. It is thus impossible for the coupling operation to be hindered by any accummulation of dirt because it is not possible for any dirt to become lodged between these functioning elements as the dirt is pushed out laterally and drops to the ground.

It will be understood that this invention is susceptible to modification in order to adapt it to different usages and conditions, and accordingly, it is desired to comprehend such modifications within this invention as may fall within the scope of appended claims.

What is claimed:

1. A coupling hook particularly for a three-pont hitch on a tractor and comprising a two-armed locking element pivotally mounted within the pocket of the hook, said locking element having means defining a locking and ejecting portion on one arm thereof, a lever pivotally connected to the other arm of said locking element and having a locking face engaging a fixed portion of the hook when the lever and locking element are in the locked position, and means within the pocket of the hook for defining a fixed fulcrum about which said lever pivots when actuated to release the locking element from its locked position.

2. A coupling hook as claimed in claim 1 wherein there is a notch on said locking and ejecting portion to receive a coupling bolt, said coupling bolt being released and ejected when the locking element is moved from its locked position.

3. A coupling hook as claimed in claim 1 and means for maintaining said lever and locking element in the unlocking position until the next coupling operation.

4. A coupling hook as claimed in claim 1 wherein said lever and locking element are moved into the locked position by a coupling bolt engaging the locking element when being received within the hook pocket.

5. A coupling hook as claimed in claim 1 and means on said lever engageable with said hook fixed portion for limiting the movement of said lever in the unlocking direction.

6. A coupling hook as claimed in claim 4 wherein said lever has an upper surface and a lower surface and said upper surface pivots about said fulcrum and said lower surface has said locking face and said limiting means thereon.

* * * * *

UNITED STATES PATENT OFFICE
CERTIFICATE OF CORRECTION

Patent No. 3,977,698     Dated August 31, 1976

Inventor(s) Wilhelm Von Allworden

It is certified that error appears in the above-identified patent and that said Letters Patent are hereby corrected as shown below:

Column 1, line 7, "lockig" should read -- locking --.

Column 1, line 11, "forms on locking" should read -- forms of locking --.

Column 1, line 54, "lokcing" should read -- locking face --.

Column 2, line 7, "closing deice" should read -- closing device -

Column 3, line 21, "of an anagle" should read -- of an angle --.

Column 3, line 32, "surfce 13" should read -- surface 13 --.

Column 3, line 55, "three pont" should read -- three point --.

Column 4, line 4, "displaacement" should read -- displacement --.

Column 4, line 8, "downwrdly" should read -- downwardly --.

Column 4, line 24, "futher" should read -- further --.

UNITED STATES PATENT OFFICE
CERTIFICATE OF CORRECTION

Patent No. 3,977,698     Dated August 31, 1976

Inventor(s) Wilhelm Von Allworden

It is certified that error appears in the above-identified patent and that said Letters Patent are hereby corrected as shown below:

Column 4, line 52, should read -- of the force applied to the eye 16 of the --.

Signed and Sealed this twelfth Day of July 1977

[SEAL]

Attest:

RUTH C. MASON
*Attesting Officer*

C. MARSHALL DANN
*Commissioner of Patents and Trademarks*